United States Patent
Tokutake

(10) Patent No.: US 10,395,651 B2
(45) Date of Patent: Aug. 27, 2019

(54) DEVICE AND METHOD FOR ACTIVATING WITH VOICE INPUT

(71) Applicant: Sony Mobile Communications AB, Lund (SE)

(72) Inventor: Kenji Tokutake, Tokyo (JP)

(73) Assignee: SONY CORPORATION, Tokyo (JP)

(*) Notice: Subject to any disclaimer, the term of this patent is extended or adjusted under 35 U.S.C. 154(b) by 268 days.

(21) Appl. No.: 13/780,010

(22) Filed: Feb. 28, 2013

(65) Prior Publication Data
US 2014/0244269 A1  Aug. 28, 2014

(51) Int. Cl.
| | |
|---|---|
| *G06F 3/16* | (2006.01) |
| *G10L 15/00* | (2013.01) |
| *G10L 15/08* | (2006.01) |
| *G10L 15/22* | (2006.01) |
| *G10L 17/00* | (2013.01) |
| *G06F 1/3215* | (2019.01) |
| *G06F 1/3234* | (2019.01) |
| *G06F 1/3293* | (2019.01) |

(52) U.S. Cl.
CPC ............ *G10L 15/22* (2013.01); *G06F 1/325* (2013.01); *G06F 1/3215* (2013.01); *G06F 1/3293* (2013.01); *G06F 3/167* (2013.01); *G10L 15/00* (2013.01); *G10L 17/00* (2013.01); *G10L 2015/088* (2013.01); *Y02D 10/122* (2018.01)

(58) Field of Classification Search
USPC ....................................................... 704/275
See application file for complete search history.

(56) References Cited

U.S. PATENT DOCUMENTS

| | | | | |
|---|---|---|---|---|
| 9,396,327 | B2* | 7/2016 | Auger | G06F 21/54 |
| 9,423,870 | B2* | 8/2016 | Teller | G06F 3/013 |
| 9,613,623 | B2* | 4/2017 | Kang | G10L 15/22 |
| 2006/0074658 | A1* | 4/2006 | Chadha | G10L 15/26 704/246 |
| 2009/0232471 | A1* | 9/2009 | Komi et al. | 386/52 |
| 2011/0044438 | A1* | 2/2011 | Wang | H04L 65/4015 379/93.02 |

(Continued)

FOREIGN PATENT DOCUMENTS

| | | |
|---|---|---|
| JP | 2009-177440 | 8/2009 |
| WO | WO 2010/078386 A1 | 7/2010 |
| WO | WO 2012/025784 A1 | 3/2012 |

OTHER PUBLICATIONS

Extended European Search Report dated May 20, 2014 in Patent Application No. 13166981.4.

(Continued)

*Primary Examiner* — Kevin Ky
(74) *Attorney, Agent, or Firm* — Xsensus LLP

(57) ABSTRACT

An information processing apparatus that detects a voice command via a microphone in order to activate the device and execute certain applications. The apparatus comprises a digital signal processor (DSP) and a host controller which are responsible for processing the voice commands. The DSP recognizes and processes voice commands intermittently while the host processor is in a sleep state, thereby reducing the overall power consumption of the apparatus. Further, when the DSP is configured to recognize voice commands intended only to activate the device, a memory having a sufficiently lower storage capacity suffices.

13 Claims, 14 Drawing Sheets

(56) References Cited

U.S. PATENT DOCUMENTS

| | | | |
|---|---|---|---|
| 2011/0145000 A1* | 6/2011 | Hoepken | G10L 15/22 704/275 |
| 2012/0010890 A1 | 1/2012 | Koverzin | |
| 2012/0259641 A1* | 10/2012 | Grant | G10L 15/193 704/275 |
| 2013/0132089 A1* | 5/2013 | Fanty | G10L 21/00 704/270 |
| 2013/0179168 A1* | 7/2013 | Bae | G10L 21/00 704/248 |
| 2013/0197914 A1* | 8/2013 | Yelvington | G06F 3/167 704/275 |
| 2013/0223635 A1* | 8/2013 | Singer | H04R 1/1041 381/56 |
| 2013/0289994 A1* | 10/2013 | Newman | G10L 15/22 704/254 |
| 2014/0229184 A1* | 8/2014 | Shires | H04L 12/12 704/275 |

OTHER PUBLICATIONS

European Office Action dated Feb. 13, 2018 in European Application No. 17205856.2 (6 pages).
Extended European Search Report dated Jun. 15, 2018 in corresponding European Patent Application No. 18166758.5, 8 pages.

\* cited by examiner

DEVICE AND METHOD FOR ACTIVATING WITH VOICE INPUT

BACKGROUND

1. Field of the Disclosure

This disclosure relates to a method of efficiently operating a device through voice instructions.

2. Description of the Related Art

Mobile devices, such as smart phones and tablets are examples of devices that are adapted to take as input a user's voice (in the form of voice commands) and perform certain instructions.

Traditionally, when processing a voice command that is intended to execute a certain application, the processing circuitry of the device (responsible for processing and analyzing the voice input), continuously monitors the input such as a microphone or the like, for voice commands inputted from the user. In doing so, the control circuit of such a device which executes an application essentially waits for the processing circuit to complete its tasks of analyzing the voice input.

In such scenarios, the electric power consumption of the device increases dramatically. Accordingly, there is a requirement to lower the power consumption in order to utilize the device in an efficient manner.

SUMMARY

Devices and methods for operating the devices via voice commands in order to lower the power consumption of the device are discussed herein.

According to one exemplary embodiment, the disclosure is directed to an information processing apparatus comprising: a microphone configured to detect input voice instructions; a memory configured to store a plurality of keywords, each keyword being associated with a predetermined function of the information processing apparatus; first circuitry configured to compare an input voice instruction with the plurality of keywords stored in the memory; and activate second circuitry, which is configured to execute an application based on the comparison.

According to another exemplary embodiment, the disclosure is directed to a method performed by an information processing apparatus, the method comprising: receiving input voice instructions from a microphone; storing a plurality of keywords in a memory, each keyword associated with a predetermined function of the information processing apparatus; comparing by a first circuitry the input voice instruction with the plurality of keywords; activating a second circuitry, by the first circuitry based on the comparing; and executing an application by the second circuitry corresponding to the keyword associated with the application.

According to another exemplary embodiment, the disclosure is directed to a non-transitory computer-readable medium including computer program instructions, which when executed by an information processing apparatus, cause the information processing apparatus to perform a process comprising: receiving input voice instructions from a microphone; storing a plurality of keywords in a memory, each keyword associated with a predetermined function of the information processing apparatus; comparing by a first circuitry the input voice instruction with the plurality of keywords; activating a second circuitry, by the first circuitry based on the comparing; and executing an application by the second circuitry corresponding to the keyword associated with the application.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
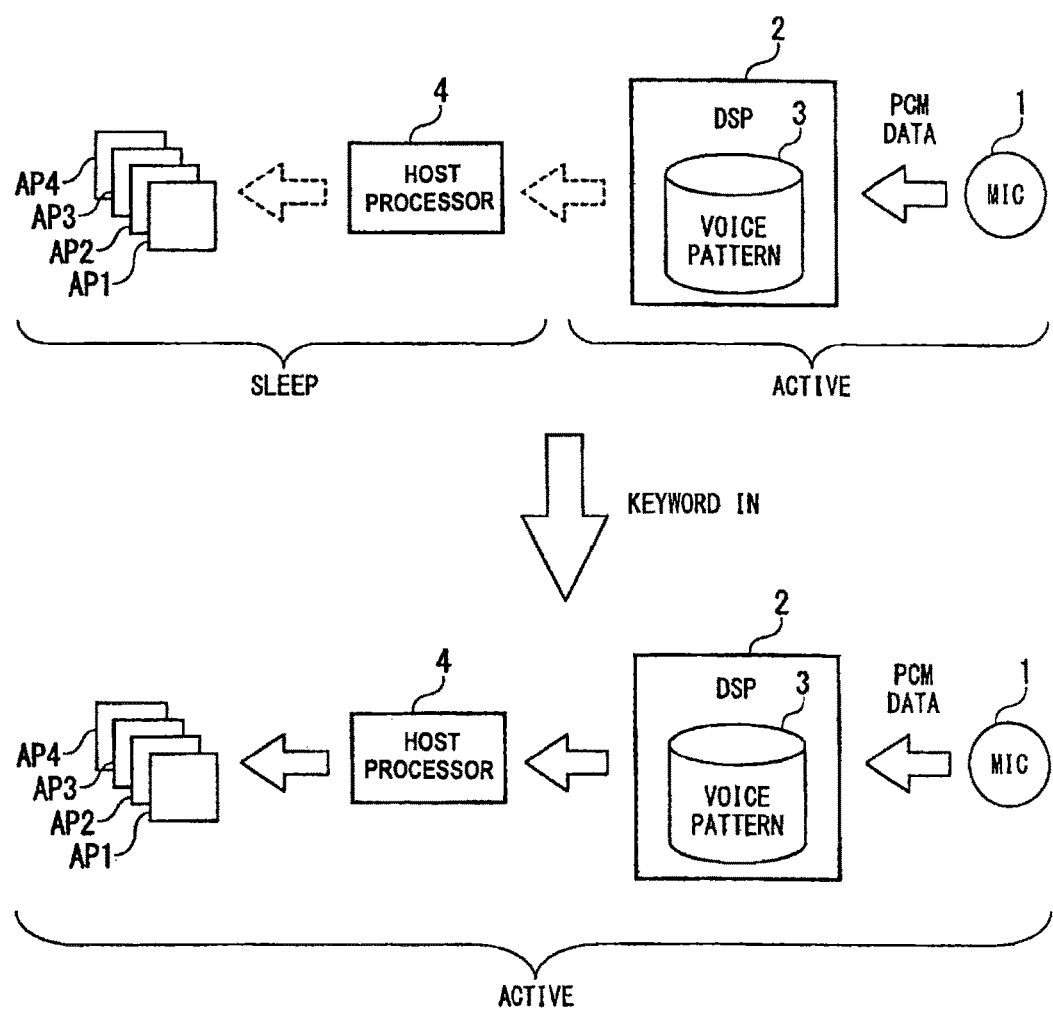
FIG. 1 illustrates schematically an exemplary scenario outlining the sleep and active states of a digital signal processor (DSP) and a host processor.

Referring now to the drawings, wherein like reference numerals designate identical or corresponding parts throughout the several views.

FIG. 1 illustrates a non-limiting exemplary scenario outlining the sleep and active states of a digital signal processor (DSP) and a host processor that are comprised within a device which is configured to take as input, voice commands (instructions) from a user in order to bring it to an active state. As shown in FIG. 1, the DSP 2, comprises a voice pattern memory 3, which stores user input data i.e., keywords which are used to activate the device. The keywords can be short words such as the name of user or simply commonly used words such as "hello". These keywords are stored in the memory by a registration process which is explained in detail later with reference to FIGS. 6 and 8.

The DSP 2, takes as input voice commands from a user which are inputted via a microphone 1. The analog data (user's voice) is modulated using a pulse code modulation (PCM) technique or the like and fed in to the DSP for further processing. The details of this voice processing and analysis are explained in detail with reference to FIG. 3. Note that DSP is an active state while it receives information from the user. At this instant in time, the host processor is kept in a "sleep" state (i.e., a suspended state). The host processor is responsible for executing certain applications based on the keyword input from a user. Low power consumption is obtained by maintaining the host processor in a sleep state, while the DSP processes the voice commands input by a user.

On receiving the input from the microphone, the DSP compares the input keyword with those stored in the voice pattern memory 3. If a match is found, the DSP notifies the host processor about a successful match via an interrupt command (discussed later with reference to FIG. 8) and brings the host processor to an active state. This process is referred to as "waking up" the host processor. The host processor on being transitioned to the active state executes a certain application (denoted by AP1-AP4) based on the recognized speech.

In one aspect of the present disclosure, a method of processing the speech data, wherein the host processor processes the data and the DSP is responsible only for the analysis of the keyword is described. In such a setting, note that the keywords are used to wake up the device. The specific execution of an application proceeds later with voice commands inputted by a user. In another aspect of the present disclosure, a method wherein the DSP is responsible for all the speech processing is described. Moreover, both embodiments outline as to how lower power consumption is obtained by specifically turning the DSP and the host processor into sleep modes.

Figure 2:
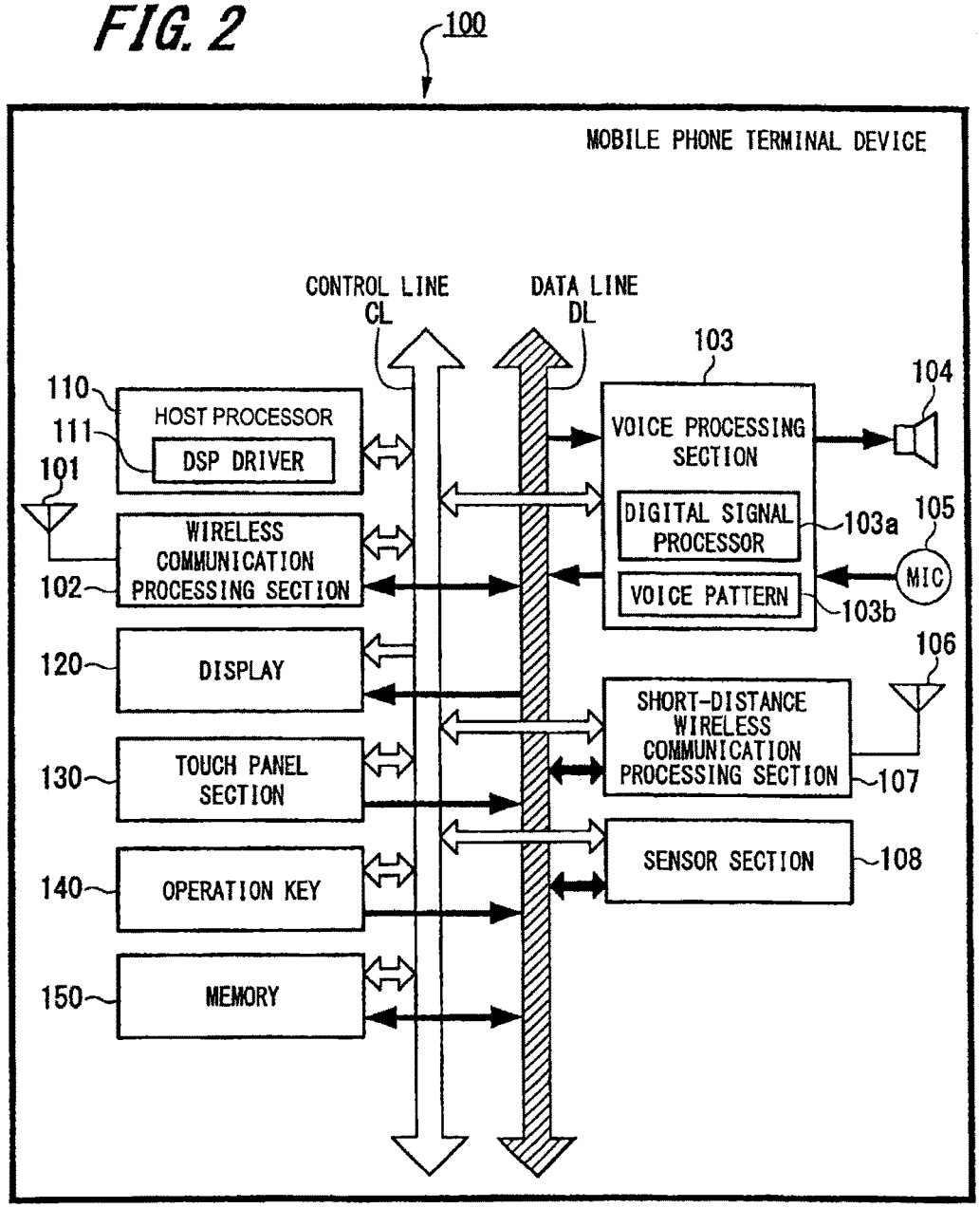
FIG. 2 illustrates schematically an exemplary mobile phone terminal device.

FIG. 2 illustrates a schematic block diagram of an exemplary mobile phone terminal device 100. As shown in FIG. 2, the mobile phone terminal device 100 may include an antenna 101 and a wireless communication processing section 102. The wireless communication processing section 102 may communicate wirelessly via radio signals, or the like, with other mobile devices via a base station. Further, a data signal, such as a voice transmission from another user, may be received by antenna 101 and sent to the wireless communication processing section 102 for further processing. In the case of an incoming voice transmission, the voice data signal may be sent from the wireless communication processing section 102 to a voice processing section 103. Incoming voice data received by the voice processing section 103 via the wireless communication processing section 102 may be output as sound via a speaker 104.

Conversely, an outgoing voice signal may be supplied by a user to the voice processing section 103 via a microphone 105. The voice signal received via microphone 105 and processed by the voice processing section 103 may be sent to wireless communication processing section 102 for transmission by the antenna 101. The voice processing section 103 comprises a digital signal processor (DSP) 103*a* which digitizes the incoming analog signal and processes the audio input to detect for keywords. Keywords enable the operation of device 100, when it is configured to operate under the instructions of specific voice commands. These keywords are preset in the device with the aid of a voice registration unit and stored in the voice pattern library 103*b*. The detailed description of this processes is explained later with reference to FIGS. 5 and 6.

A second antenna 106 may be supplied for use with a short distance wireless communication processing section 107. The short distance wireless communication processing section 107 may communicate wirelessly with other devices over a network, such as the Internet, a local area network (LAN), or a wide area network (WAN). The second antenna 106 may, e.g., by a Wi-Fi transceiver.

A sensor section 108 may be provided for the mobile phone terminal device 100. The sensor section 108 may be a motion sensor that detects a motion of an object in the proximity of the mobile phone terminal device 100. The motion may correspond to a user moving an instruction object, such as a finger or stylus, in the proximity of the mobile phone terminal device 100 for the purpose of selecting data displayed on display 120.

The mobile phone terminal device 100 may include display 120. The display 120 may be, for example a liquid crystal display (LCD) panel, an organic electroluminescent (OLED) display panel, a plasma display panel, or the like. The display 120 may display text, an image, a web page, a video, or the like. For example, when the mobile phone terminal device 100 connects with the Internet, the display 120 may display text and/or image data which is transmitted from a web server in Hyper Text Markup Language (HTML) format and displayed via a web browser. The display 120 may additionally display data stored in a memory 150.

A touch panel section 130 can detect a touch operation on the surface of the display 120. For example the touch panel 130 can detect a touch operation performed by an instruction object such as a finger or stylus. Touch operations may correspond to user inputs such as a selection of an icon or a character string displayed on the display 120. The touch panel section 130 may be an electrostatic capacitance type device, a resistive type touch panel device, or other such type devices for detecting a touch on a display panel.

The touch panel section 130 may perform processing related to touch operation classification. For example, the touch panel section 130 may assign a predetermined function to be performed when a "tap" touch operation is detected. Similarly, the touch panel section may analyze a touch operation in which the instruction object makes continuous contact with the display 120 while moving the instruction object around the display 120 (e.g., a "swipe" operation). The touch panel section 130 may output a signal based on a classification of the touch operation performed. The signal may for example include information indicating the touch operation classification, the location on the display 120 where the touch operation was performed, and the operation to be performed based on the touch operation.

Data which is detected and processed by the touch panel 130 can be transmitted to a host controller 110. The host controller/processor 110 may include one or more processor units and can control each element of the mobile phone terminal device 100 based on data detected by the touch panel 130, or by inputs received from operation key 140. The operation key 140 may receive inputs, e.g., from external control buttons included with the mobile phone terminal device 100. The external control buttons may for example control the volume, the power, or a hold operation for the mobile phone terminal device 100.

The host controller 110 may further execute instructions stored in the memory 150. The controller may further comprise of a DSP driver 111, which is configured to communicate with the DSP 103*a*. Specifically, the driver may actuate the DSP during a voice registering phase, or the DSP 103a may initiate communication with the driver upon the successful detection of a voice command. The driver 111 may further activate the host processor to execute a certain application based on the received voice commands. The specific details pertaining to the driver 111 and the host controller are explained later with reference to FIG. 5. To this end, the memory 150 may be a non-transitory computer readable medium having instructions stored therein for controlling the mobile phone terminal device 100. Further, the controller 110 may include one or more processors for executing the instructions stored on the memory 150.

The mobile phone terminal device 100 can include a control line CL and a data line DL as internal bus lines for communication. The control line CL can be used to transmit control data from the controller 110. The data line DL may be used for the transmission of voice data, display data, or the like, throughout the various elements of the mobile phone terminal device 100.

Figure 3:
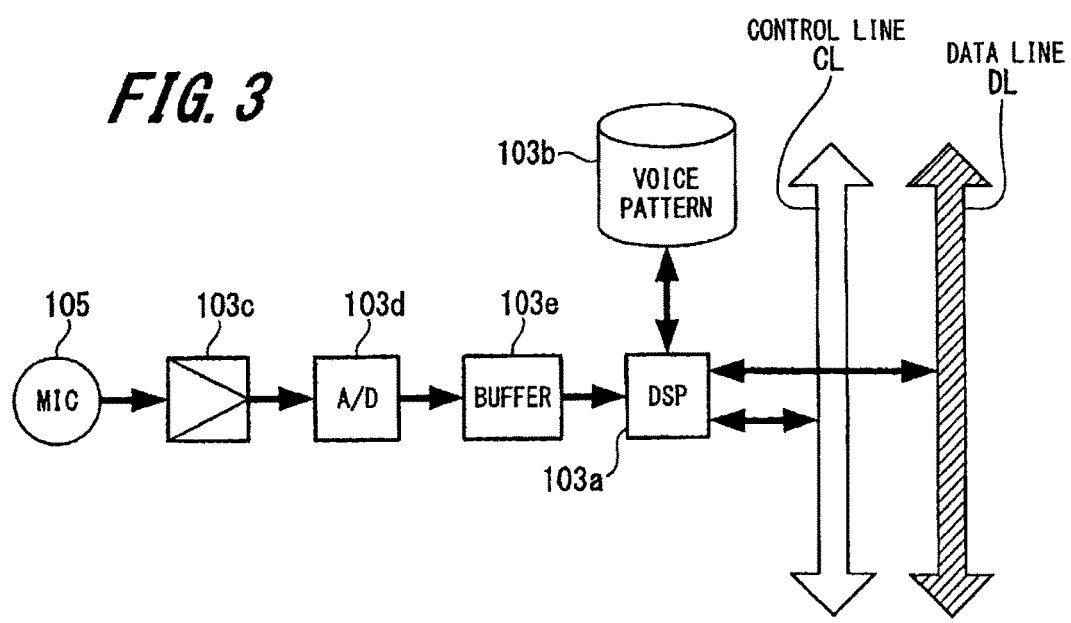
FIG. 3 illustrates schematically the structure of a DSP speech processing unit.

FIG. 3 illustrates a block diagram depicting the processing of a voice command input by a user via the microphone 105. The output of the microphone is first amplified before further processing by an amplifier 103c. After modulating the input voice (speech) by using a modulation scheme like the pulse code modulation or the like, the signal is input to an analog to digital converter 103d. This converter obtains digital samples of the input analog voice signal and stores them in a memory buffer 103e.

The DSP processor 103a performs processing on these digitized voice samples and checks for a match with certain user input keywords which are stored in a voice pattern memory 103b. Note that these keywords are small words/phrases such as "hello", the user's name and are used to wake up the device. Specific details pertaining to how the keywords are stored in the memory and the process of initiating an application execution will be explained later with reference to FIGS. 6 and 8. Note that the DSP may perform further processing on the voice samples such as noise removal, voice compression etc, to further clean and/or make compact the input voice samples for better processing.

The DSP communicates with the host processor via a control line (CL) and a data line (DL). Specific instructions and control signals are exchanged between the processors by using the CL. Data pertaining to the inputted voice command via the microphone is exchanged with the host processor via the DL. This exchange of information between the DSP and the host processor is explained in detail with reference to FIGS. 5 and 7.

Figure 4:
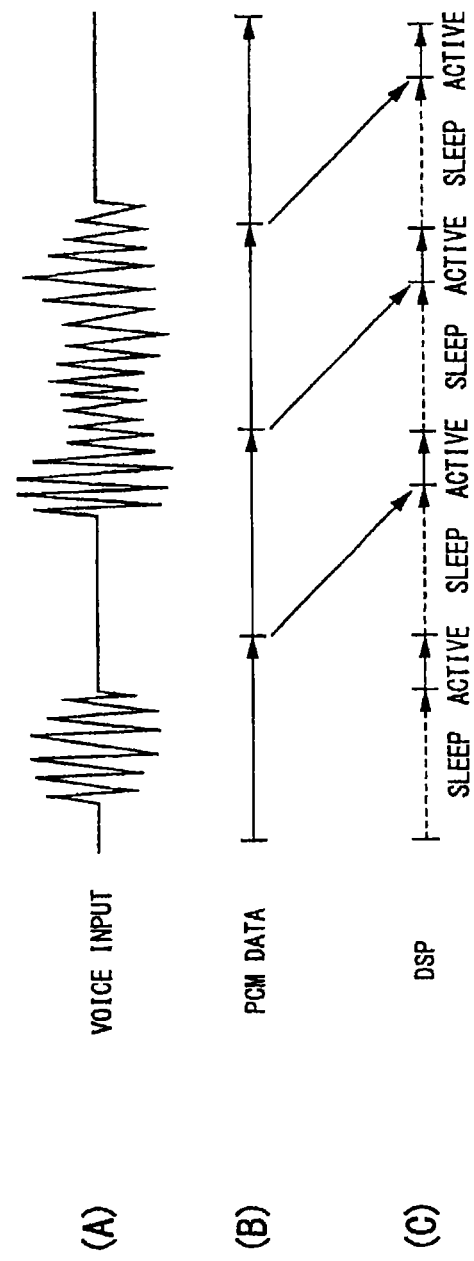
FIG. 4 illustrates an exemplary non-limiting example of the processing states in the DSP.

FIG. 4 depicts a non-limiting example of the processing states involved in the DSP and illustrates the active and sleep cycles of the DSP. FIG. 4A depicts a standard analog audio signal that is input to apparatus 100 via the microphone 105. In FIG. 4B, a modulation scheme such as pulse code modulation (PCM) is applied to the analog signal, which is further processed in an A/D converter to obtain digital samples. As stated previously, these digital signals are stored in the buffer memory 103e. The digital data is read from the buffer memory and transferred to the DSP 103 for processing at every fixed time-period. Note, that as shown in FIG. 4C, the DSP is in an active state only when the data (at every fixed time period) is read from the memory and transferred to the processor. At all other times the DSP remains in a sleep mode, thus enabling the decrease of power consumption.

While being in active state, the DSP reads the data from the buffer memory 103e and compares (for a match) the input data to the set of keywords that are stored in the voice pattern memory 103b. On finding a successful match, the DSP notifies the host processor of the matched keyword and brings it to an active state. Note that the host processor is in the sleep state while the DSP performs the comparison process. Further, it must be appreciated that the DSP is in an active state only when data is read from the buffer 103e for further processing. At all other times when data is not fed from the buffer, the DSP remains in a sleep state. Thus it must be appreciated that by alternating from a sleep to active state, the DSP operates in an intermittent manner thus providing a valuable savings in terms of operating power. Further, note that by keeping the host processor in a sleep state (while the DSP performs it's processing), and activating it only when a keyword match is successfully detected by the DSP, a further savings in the power consumption of the apparatus 100 is obtained.

Figure 5:
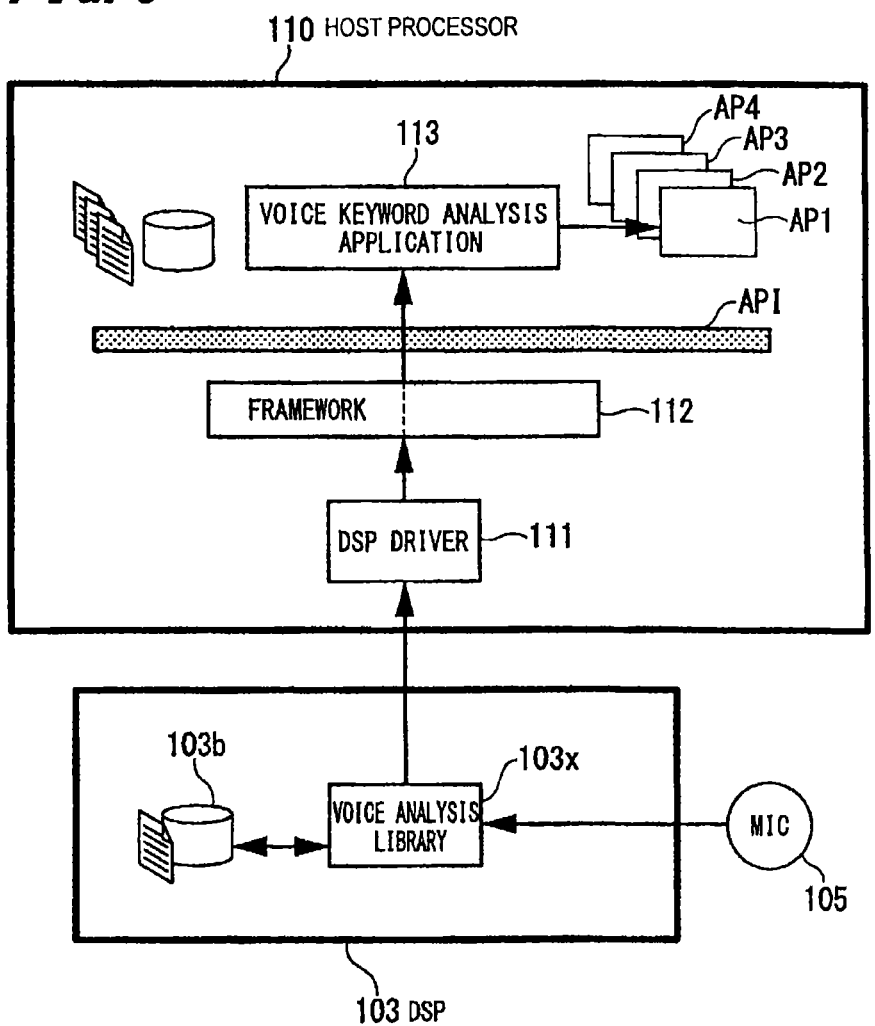
FIG. 5 illustrates the processes conducted by a host processor.

FIG. 5 illustrates the processing steps performed by a host processor upon successful keyword match detected by the DSP. As shown in FIG. 5, the DSP 103 includes a voice analysis library 103x and a voice pattern memory 103b. The voice command received from the microphone 105 is input to the voice analysis library wherein the input voice command is compared with the keywords stored in the voice pattern memory 103b for a match. Upon a successful match, the DSP instructs (via control signals) the DSP driver 111 comprised within the host processor to transition to an active state.

Once in active state, the DSP driver initiates the keyword recognition process by instructing the keyword analysis application 113 to perform a search for the appropriate application that is to be executed. Note that the instruction to perform the application search is sent from a framework unit 112, to the application analysis unit 113 via an application interface. On receiving instructions from the DSP driver 111, the keyword analysis application searches for the application within the application set AP1-AP4, for the keyword associated with the application. On finding the correct match the appropriate application is executed.

Note that in the above process, the DSP 103 performs only a keyword match of the input voice command with the keywords registered by a user and stored in the voice pattern memory. Until a successful match is obtained the host processor remains in a sleep mode. On finding a successful match, the DSP activates the host controller (processor) via the DSP driver. The host controller on receiving the keyword from the DSP, runs a search through the application database to search for the application associated with the keyword. Thus the process of application recognition is performed by the host controller.

Figure 6:
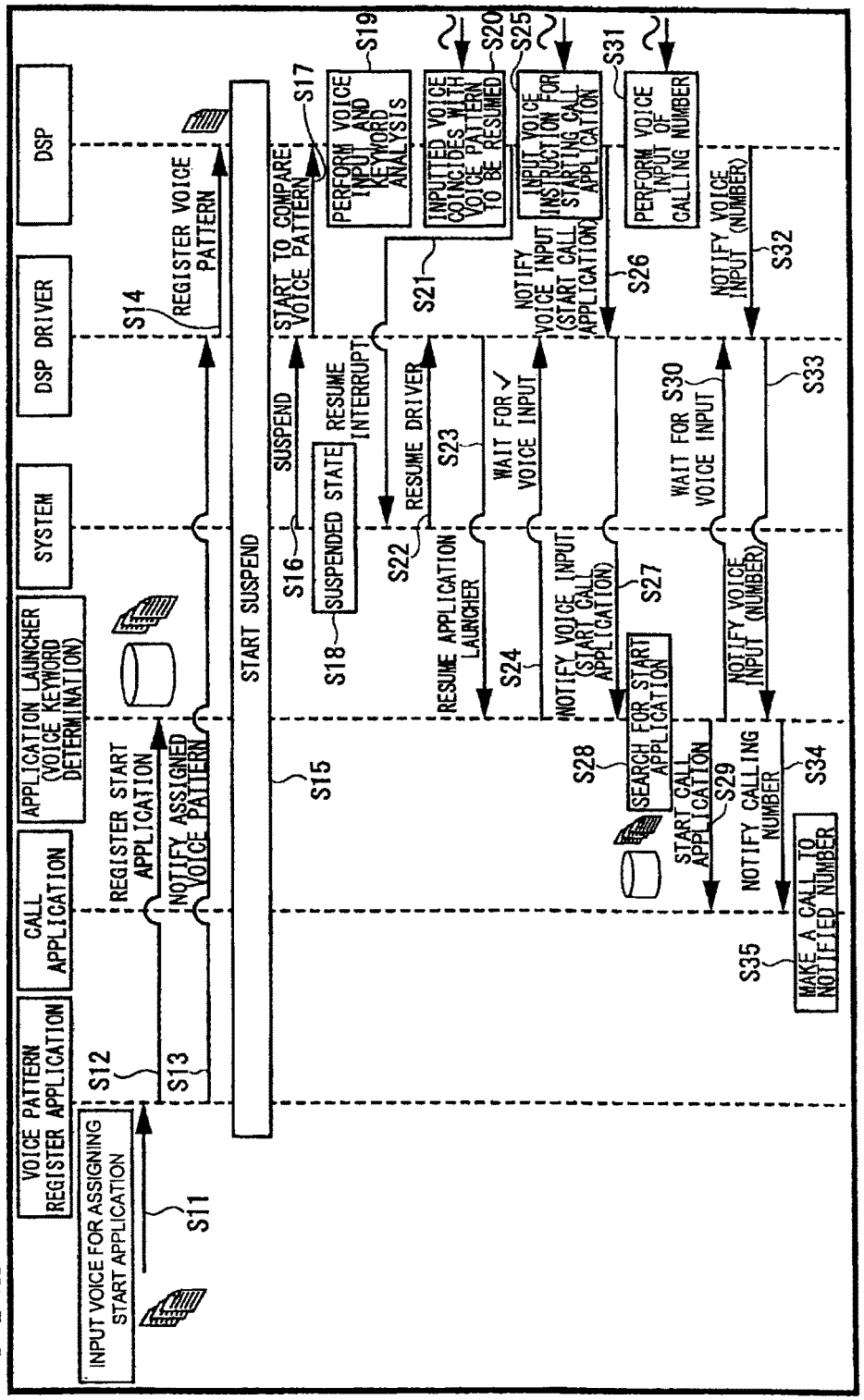
FIG. 6 illustrates an exemplary flowchart depicting a method to wake up a device (i.e., brought to an active state) via a voice recognition process according to one aspect of the present disclosure.

FIG. 6 is a flowchart of the process for waking up the device and outlines the steps undertaken to recognize an input voice command according to one aspect of the present disclosure. Note that in this example the host processor 110 performs the voice registration process and the input processing of the audio signal. Further we assume for the sake of simplicity that the application intended to be executed by the voice command is one of making a telephone call.

In step S11, a user inputs a voice command that is assigned to start an application. This command is registered in the voice pattern registration application. Note that commands such as "hello" or a user's name can be assigned to indicate a start of the application execution. In step S12, the voice pattern registration application registers the start of the specific application (with respect to the input keyword) in the application launcher.

In step S13, the voice pattern registration application notifies the DSP driver 111 about the assigned voice pattern, which in turn, in step S14 registers the assigned voice pattern in the DSP 103. The DSP stores information pertaining to the assigned voice keyword in its voice pattern memory 103b. This stored information is used later to obtain a match, when a user inputs a voice command via the microphone 115.

In step S15, the host controller initiates a suspension (sleep) state for all units other than the DSP 103a. In step S16, the control unit of the host processor brings the DSP driver 111 (comprised within the host processor) to a sleep state. Note (as shown in step S17) that the DSP driver initiates a start of comparison of voice pattern to the DSP 103a. Once the DSP driver has initiated this start of comparison process to the DSP, the host controller 101 is completely in a suspension state (step S18).

In step S19, the DSP 101a takes as input, voice commands from the microphone 115 and compares the inputted commands to the keywords stored in the voice pattern memory 103b. Note that this process is performed intermittently as shown in FIG. 4. Specifically, the DSP undergoes cycles of sleep and active states depending on the time it receives input from the buffer memory.

Step S20 depicts the case wherein the inputted voice command has resulted in a match with one of the keywords stored in the voice pattern memory. Note that keywords intended to start the apparatus are small words/phrases such a "hello" or a users name. On detecting a match, in step S21 the DSP triggers the host processor via an interrupt signal. In doing so, the host processor which was in a sleep/suspended state is transitioned to an active state. The host processor further triggers the DSP driver 111 to an active state (step S22). In step S23, the DSP driver initiates the application launcher which in turn signals the DSP driver to be in a wait state (step S24). Specifically, the application launcher upon transitioning to an active state signals the DSP driver to wait for further voice commands from the DSP. Note that at this point of time no application is yet executed, rather, with the use of a keyword the DSP and the host processor are activated to receive and process further instructions as to which specific application is to be executed.

Steps S25 to S35 illustrate the process from the time an input voice instruction is fed to the DSP 103 to the time the host processor executes the specific application. In step S25, the user inputs a voice instruction such as "make a telephone call" via the microphone 115. This instruction is transmitted from the DSP to the DSP driver in step S26, which in turn invokes the application launcher and notifies it about the specific voice instruction, as shown in Step S27.

In step S28, the application launcher performs an audio analysis as described in FIG. 5. Based on the content of the data (voice) obtained, the audio analysis application 113 searches for the appropriate application to execute. In the example depicted in FIG. 6, we consider an application of making a telephone call. Thus, the application launcher initiates the call application in step S29. In step S30, the application launcher notifies the DSP driver to wait for further instructions from the user. For example, the application launcher may request the DSP driver to receive the specific number to be called from the DSP.

On receiving this information in step S31, the DSP notifies the driver of the number to call (step S32) which in turn passes the information to the application launcher (shown in step S33). Finally, the application launcher notifies the call application of the number to call in step S34, wherein-after the specific application (call application in this example) executes the associated task as shown in Step S35.

Figure 7:
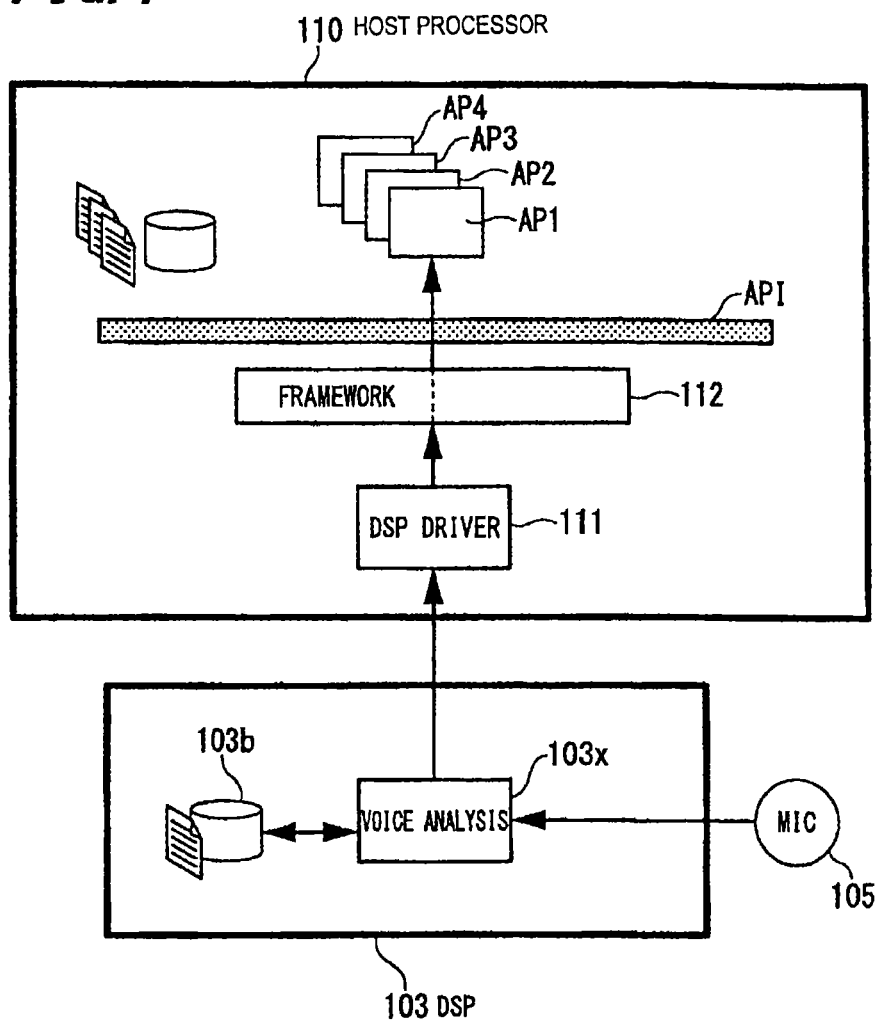
FIG. 7 illustrates the audio (speech) analysis performed by the DSP.

FIG. 7 illustrates according to another aspect of the present disclosure, a method of waking up the device and outlines the steps undertaken by the host processor when the DSP conducts the processes pertaining to voice analysis. Note that in the first aspect of the disclosure (FIGS. 5 and 6), the DSP performed voice analysis only to activate the host processor. This was accomplished with the use of a keyword such as "hello" which would initiate (i.e., bring to active state) the host processor.

In the illustration of FIG. 7, the DSP's voice pattern memory memorizes not only keywords associated to start the apparatus but also maintains a list of voice instructions required to execute an application. The voice analysis unit 103x, receives input instructions from the microphone 105, and compares the instructions with those stored in the voice pattern memory 103b.

Upon finding a match, the DSP notifies the DSP driver 111 (of the host processor) of the match, through an interrupt command. Note that the interrupt command varies depending upon the application type to be executed. The driver transmits the information received from the DSP to a framework unit 112, which through an application interface (API) executes the appropriate application.

Figure 8:
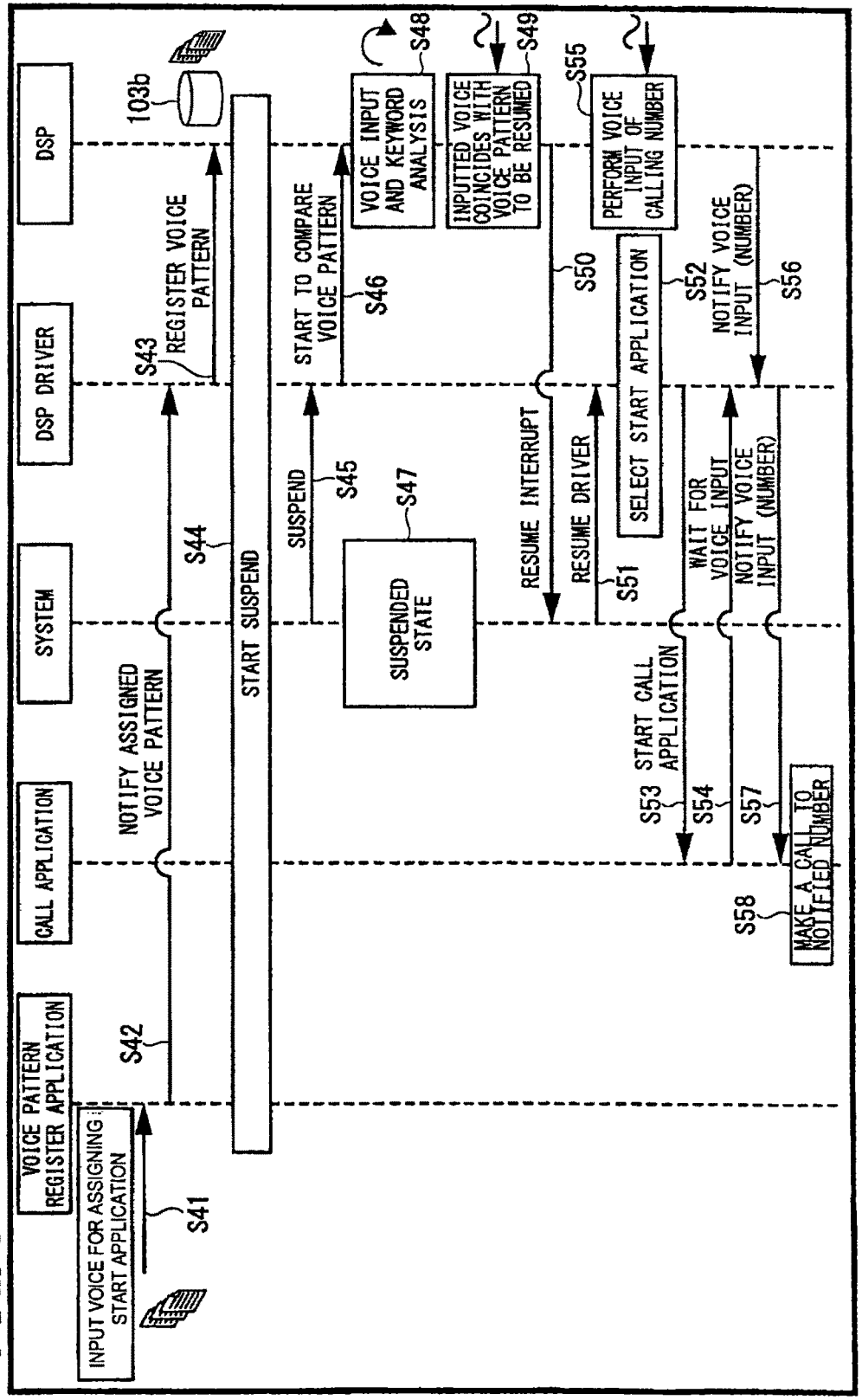
FIG. 8 illustrates an exemplary flowchart depicting a method to wake up a device via a voice recognition process according to a second aspect of the present disclosure.

FIG. 8 represents a flowchart of the voice recognition process for the example described in FIG. 7. For sake of illustration, we consider the same application, that of making a phone call to explain the steps of the process of FIG. 8.

In step S41, a user inputs a voice command that is assigned to start an application. This command is registered in the voice pattern registration application. Note that commands such as "hello" or a user's name can be assigned to indicate a wake up of the processors to further execute a start of the application. In step S42, the voice pattern registration application notifies the DSP driver 111 of the pattern registered to activate the apparatus 100.

In step S43, the DSP driver notifies the DSP of the voice pattern. Note, that in this case, the memory 103b associated with the DSP stores the voice pattern for activating the host controller as well as the instructions that initiates the execution of an application. In step S44, the host controller initiates a suspension (sleep) state for all units other than the DSP 103a. In step S45, the control unit of the host processor brings the DSP driver 111 (comprised within the host processor) to a sleep state. In step S46, the DSP driver signals the DSP 103 to start the process of comparing an input voice pattern with those stored in the memory of the DSP. At this time instant, the DSP conducts a voice analysis by the method described in FIG. 4. Specifically, the DSP operates in an intermittent fashion wherein it undergoes a series of periodic sleep and active states. Note that while the DSP performs processing of the input voice instructions (step S48), the host controller is in a suspension state as shown in step S47.

In step S49, once the DSP has confirmed a match between the voice instruction inputted from the microphone 105 and the voice pattern stored in the memory 103b, it sends an interrupt signal to the controller, thereby indicating the controller to resume an active state (step S50). The controller once activated, instructs the DSP driver in step S51, to transition the active state.

Once the DSP driver is in the active state it selects the application to start and invokes the corresponding application as shown in Step S52. Note that in this case, we consider a simple application to make a telephone call. Accordingly the DSP driver, in step S53 initiates a telephone call operation. In step S54, the application (for example the call application) instructs the DSP driver to wait for further input from the DSP 103. This input pertains to the number required by the call application in order to make the telephone call. This number is inputted as shown in step S55 and is notified to the DSP driver in step S56. The number is further transmitted to the call application (step S 57) which finally makes the telephone call in step S58. Note that in both aspects presented thus far, the DSP and the host processor are put in a sleep mode when not processing information thereby providing a means to lower the power consumption of the apparatus.

Figure 9:
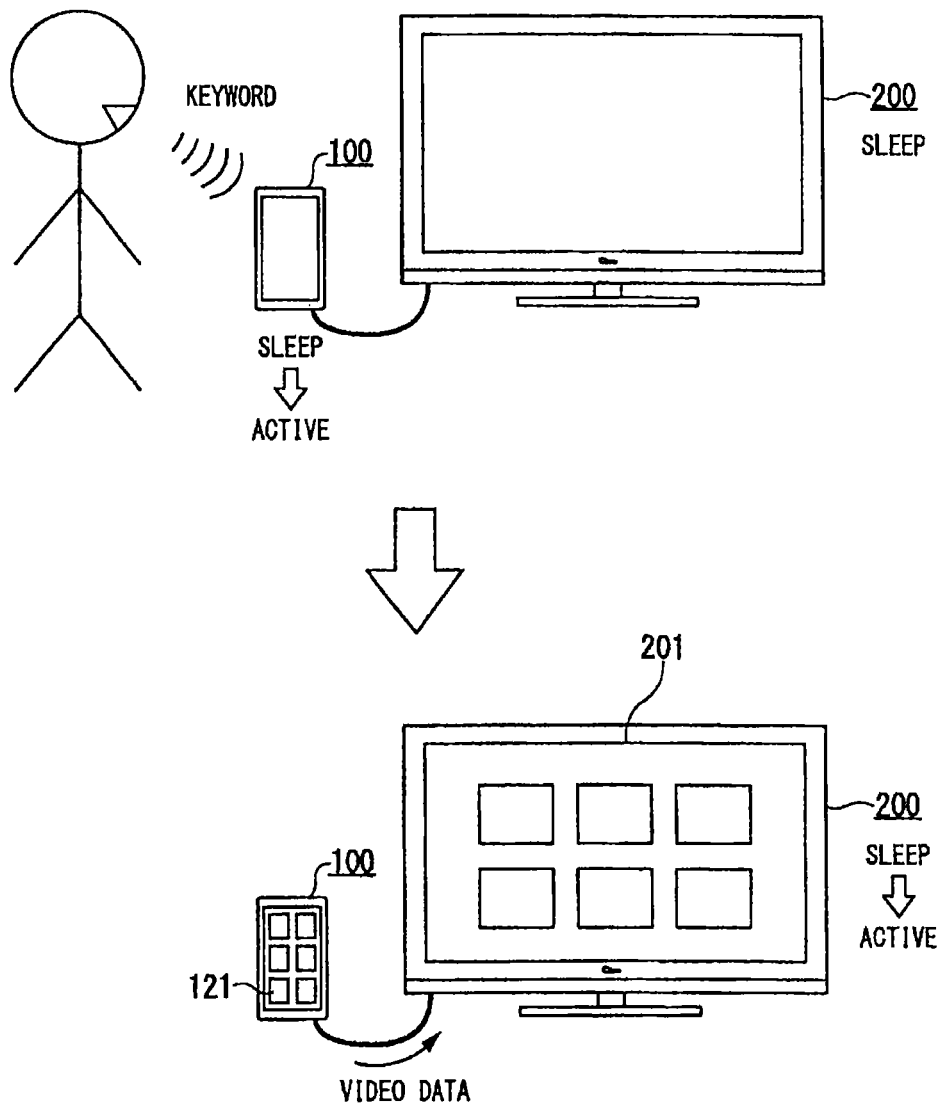
FIG. 9 depicts a non-limiting example of an apparatus (a mobile phone) that transitions to an active state via voice commands according to the present disclosure.

FIG. 9 illustrates how an apparatus (e.g. a mobile phone terminal) can be configured to be activated by voice instructions to perform a certain application. We consider an example of transferring data (images, text or the like) from the apparatus 100 to a display terminal 200. Note that the example depicts the two devices connected by a wired mechanism. However, the means of connecting this device is in no way limiting the example. For example, the apparatus 100 and the display terminal 200 may well be connected by a wireless mechanism to achieve the end objective, Initially, both the apparatus 100 and the display terminal 200 are in a suspended state. On receiving instructions from a user the apparatus 100 makes a transition to the active state. Specifically, the apparatus 100 recognizes the voice pattern (keyword) inputted by a user, to bring it in an active state. On transitioning to the active state, the apparatus 100 instructs the display to turn in to the active state.

Once the devices are activated, the display terminal 200 displays data 121 of the mobile phone terminal on its display screen 201. Hence, in this manner the display of information from a mobile phone to a display terminal is accomplished by the use of voice instructions implemented in a manner presented in the present disclosure.

Figure 10:
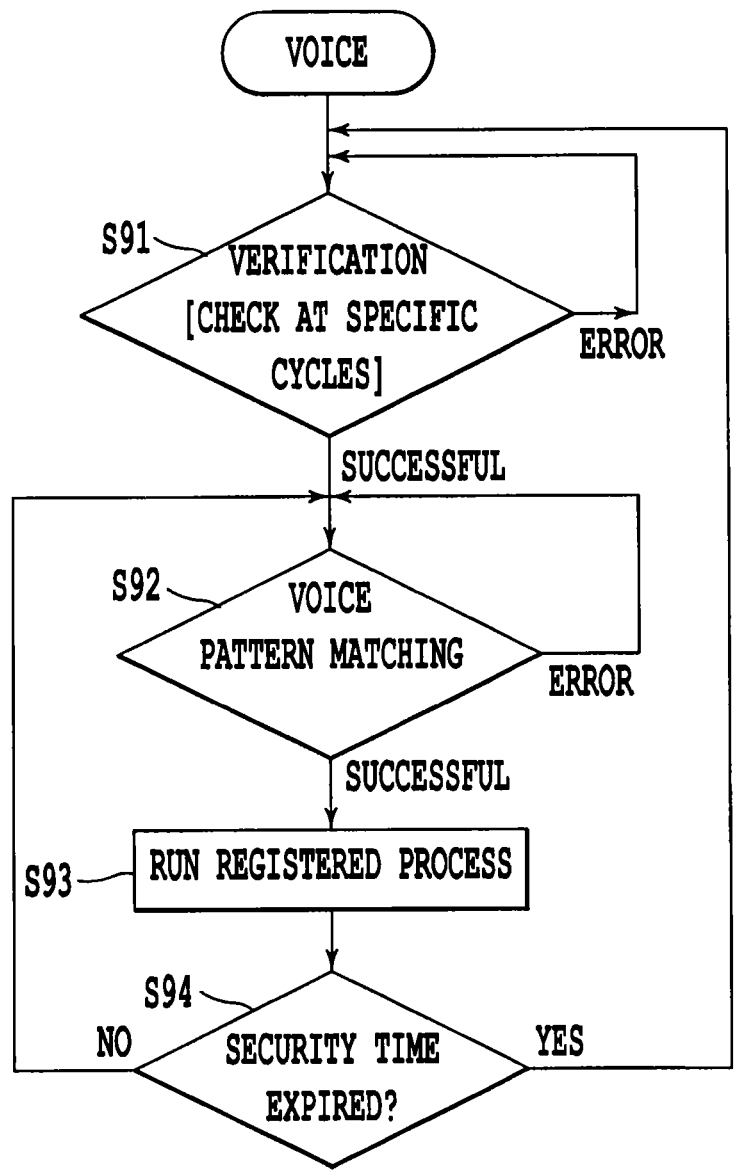
FIG. 10 illustrates an exemplary flowchart depicting the steps taken while performing a voice pattern analysis.

FIG. 10 illustrates an exemplary flowchart depicting the steps taken while performing a voice pattern analysis (i.e., voice recognition process). The voice pattern analysis process includes two steps: a voice verification step and a voice pattern matching step.

In the voice verification step, the voice of a registered (i.e., authorized) user is first verified. Specifically, an input voice is matched with a registered voice by verifying, in detail, the characteristics of the input voice waveform. Further, the keyword associated with the voice is also verified. In doing so, a security mechanism is created wherein unauthorized users are not granted access to unauthorized devices. For example, if an authorized user has registered the word 'hello' to activate a mobile phone, only the keyword ('hello') spoken by the authorized user will activate the mobile phone.

Once the device is activated by the authorized user, the voice pattern matching step processes further voice instructions. The processing in this step simply verifies if an appropriate keyword associated with an application is input. For example, if a voice instruction "make telephone call", is associated with the application of making a telephone call by the mobile phone, in the voice pattern matching step the input keyword is verified. Note that access in this step is granted to all users. Specifically, once the device is activated by the authorized user, any user can execute an application on the device, as long as the correct instruction is input to the device.

FIG. 10 illustrates the steps performed by the voice pattern analysis process. First, the voice verification process is executed at specific time instants that correspond to the instants of time the DSP of the device is active (as shown in FIG. 4). In step S91, a query is made to check if the voice verification is successful. If the response to the query is affirmative, the process proceeds to step S92, wherein the voice pattern matching process is performed. If the response to the query in step S91 is negative (i.e., the voice verification is erroneous) the process simply loops back to step S91.

In step S92 a query is made to check if the voice pattern matching is successful. If the response to this query is negative, the process loops back to step S92, wherein the device awaits the input of the appropriate voice instruction. If the response in step S92 is successful, the process proceeds to step S93 wherein the application associated with the instruction is executed.

In step S94, a query is made to check if a security time has elapsed from the onset of a successful voice verification process. If the response to the query is affirmative, the process loops back to step S91, wherein the device needs to be activated again by the authorized user. However, if the response to the query is negative, the process loops back to step S92, wherein the DSP of the device awaits further instructions from a user to execute an appropriate application.

Figure 11A:
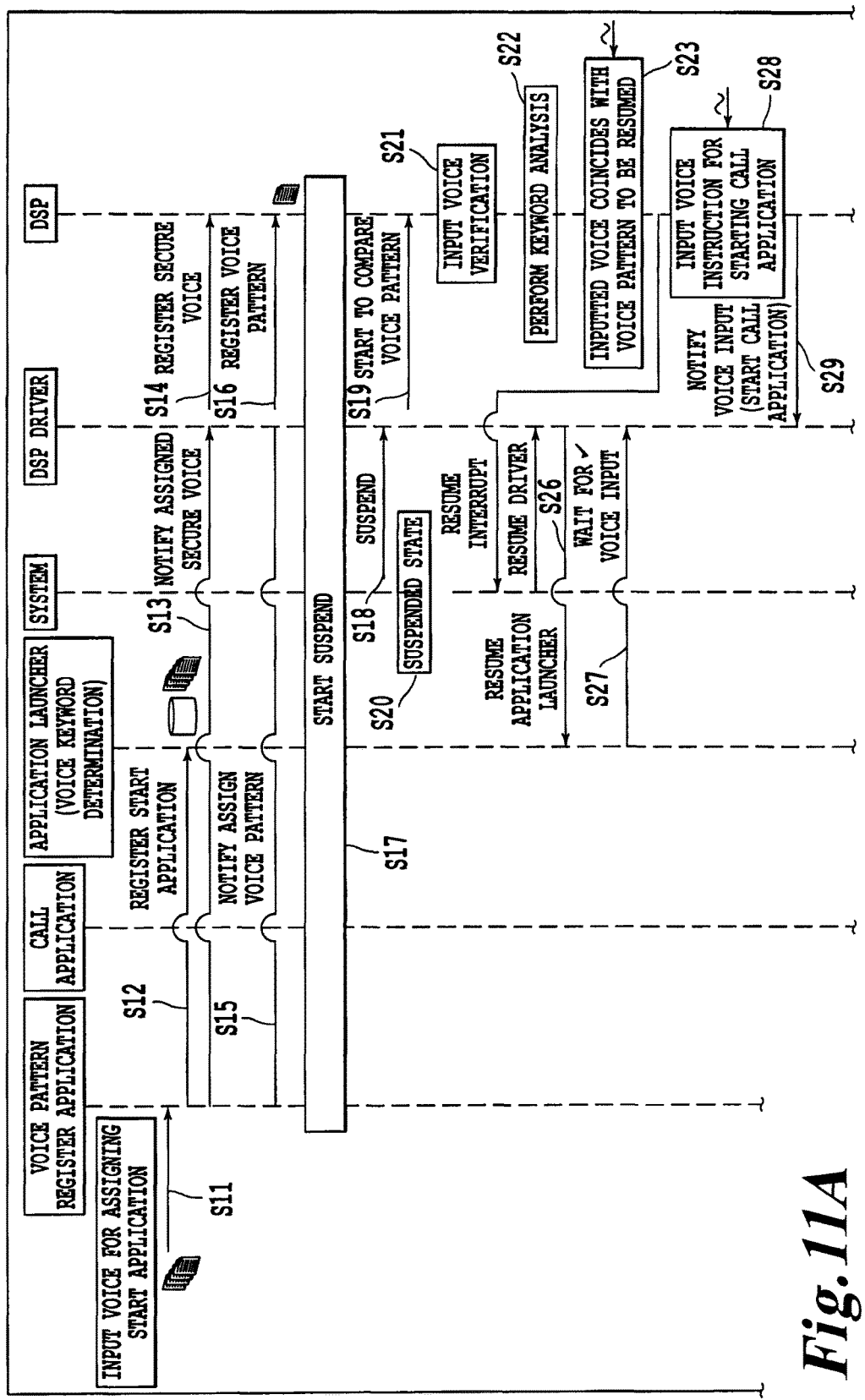
FIGS. 11A and 11B illustrate an exemplary flowchart depicting a method to wake up a device by a voice recognition process according to another aspect of the present disclosure.
Figure 11B:
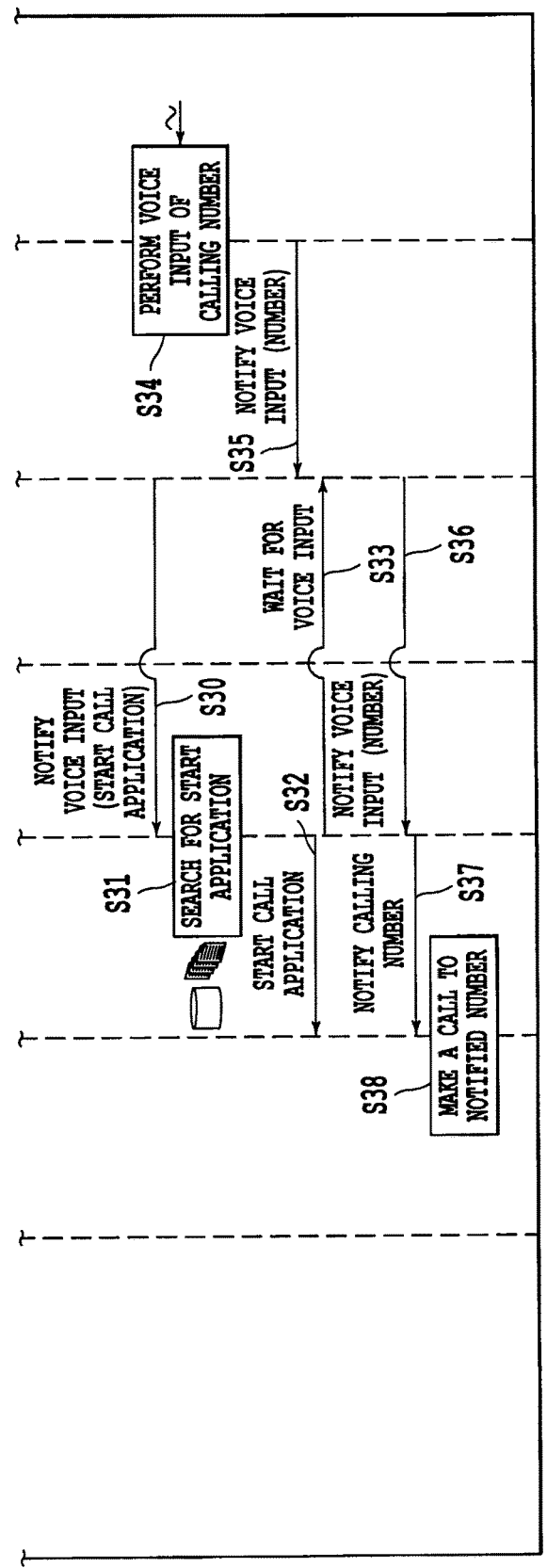

FIGS. 11A and 11B illustrate an exemplary flowchart depicting a method to wake up a device by a voice recognition process according to another aspect of the present disclosure. Note that the flowchart of FIG. 11B depict the steps performed after the steps of the flowchart depicted in FIG. 11A are executed. Further, note that the flowcharts of FIGS. 11A-11B are similar to the flowchart of FIG. 6, and differ in the voice pattern analysis process. In what follows, we explain the steps of the flowcharts of FIGS. 11A-11B that differ from the steps of FIG. 6.

After the voice pattern registration application registers the start of a specific application (with respect to an input keyword) in the application launcher (step S12), the voice pattern registration application notifies the DSP driver, in step S13, the voice of the authorized user.

In Step S14, the authorized voice is registered in DSP 103, by the DSP driver. Note, that in doing so, an unauthorized user is not granted permission to activate the device. Further, the flowcharts of FIGS. 11A-11C, differ in the manner in which the voice analysis is performed. As shown in step S21, a voice input via the microphone is first verified by processing the input voice waveform and matching the voice to that of the authorized user. Further, in step S22, the keyword input to activate the device is analyzed.

Figure 12:
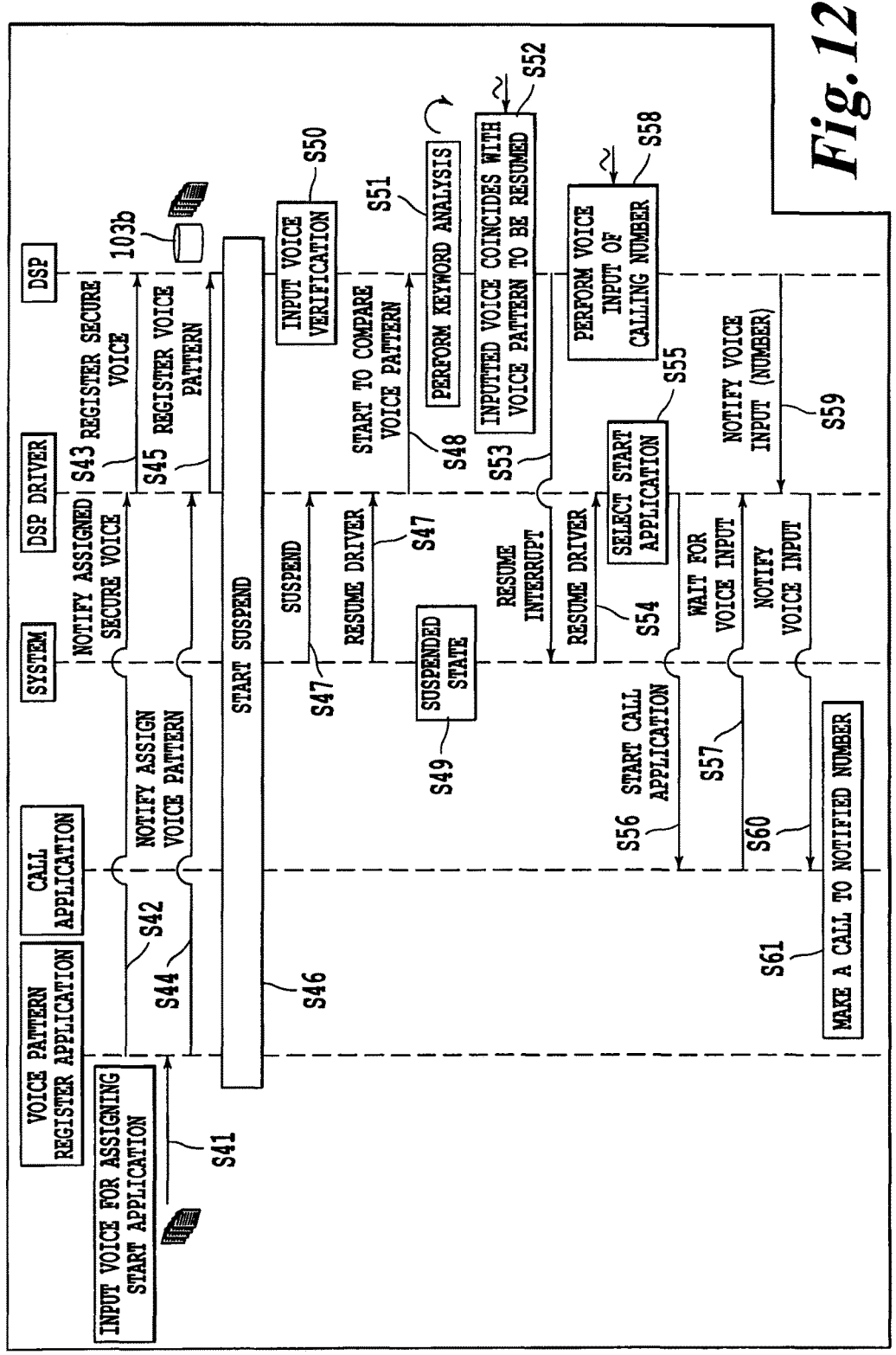
FIG. 12 illustrates an exemplary flowchart depicting a voice recognition process implemented in the method of FIG. 8 to wake up a device.

Upon a successful match, the device is activated, thus enabling it to accept further voice instructions (step S23) from any user to execute an application. For the sake of simplicity, we consider the same application (as in FIG. 6) of making a telephone call. The further steps that execute the telephone call application are similar to those of FIG. 6. Similarly, FIG. 12 depicts according to another embodiment of the present disclosure a flowchart depicting the steps taken to wake up a device by using a voice recognition process. Specifically, the flowcharts of FIG. 12 is similar to the flowchart of FIG. 8, and differs in the voice pattern analysis process, which is similar to the voice pattern analysis process as described in FIGS. 11A and 11B.

Figure 13A:
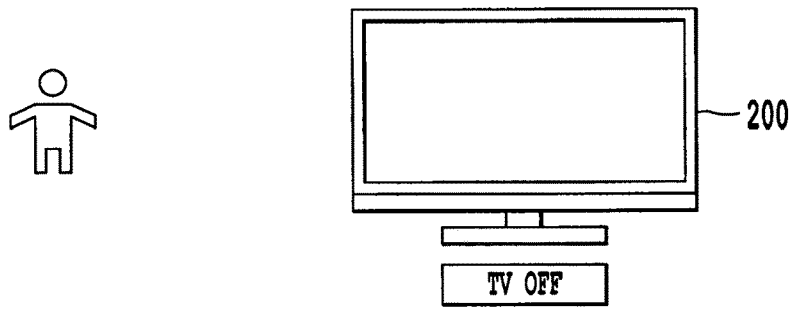
FIGS. 13A-13C depict another non-limiting example illustrating the execution of an application using the voice pattern analysis of FIG. 10.
Figure 13B:
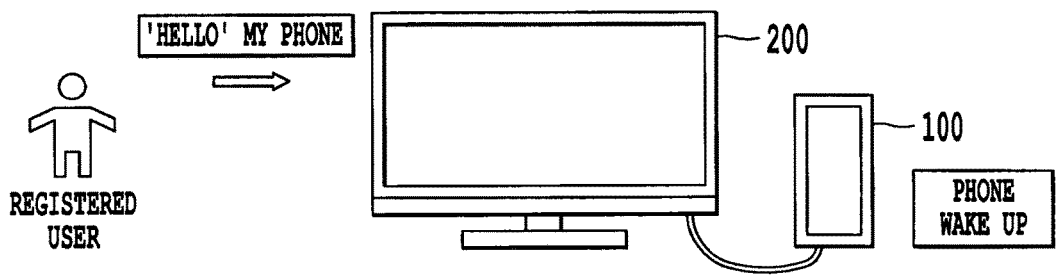
Figure 13C:
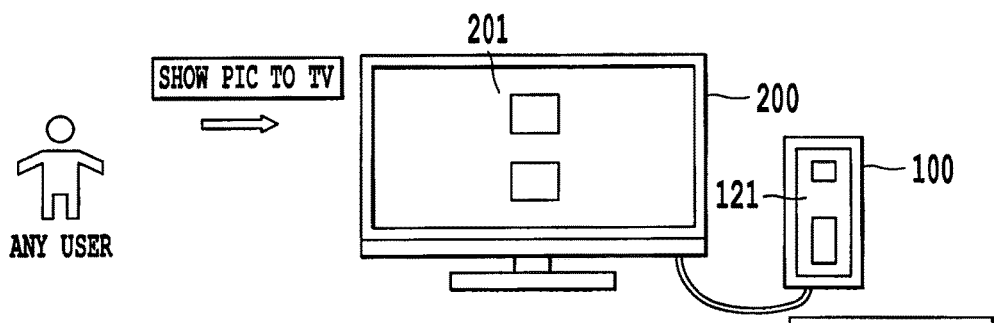

FIGS. 13A-13C depict a non-limiting example illustrating the execution of an application using the voice pattern analysis process of FIG. 10.

Initially, as shown in FIG. 13A, the display terminal 200 is in an inactive state (OFF). On receiving instructions from an authorized user, the mobile terminal 100 that is connected to the display terminal 200, is brought to an active state. Note, that only the voice of the authorized user can enable the mobile terminal to transition to an active state (ON state). A predetermined instruction such as 'Hello my phone' can be used by the user to activate the mobile terminal 100, as shown in FIG. 13B.

Upon activating the mobile terminal, an application can be executed by any user. FIG. 13 C depicts an example wherein a user intends to display pictures from the mobile terminal 100 to the display terminal 200. A pre-determined instruction such as 'Show pictures on TV' can be used to indicate the execution of transferring pictures to the display terminal. Note that the processing involved in this stage, matches only the instructions spoken by the user to the keyword associated with the application. Specifically, the voice waveform is not processed in detail to match a registered user's voice, thus enabling any user to execute an application, provided that the devices have been activated by a authorized user.

Obviously, numerous modifications and variations of the present invention are possible in light of the above teachings. It is therefore to be understood that within the scope of the appended claims, the invention may be practiced otherwise than as specifically described herein. For example, the DSP as presented in FIG. 3 may be configured in another manner, wherein the input data is modulated by mechanisms other PCM. Further, the application considered in this disclosure was that of making a telephone call. Similarly, other applications which can be voice activated can be implemented in a manner as disclosed in FIGS. 6 and 8. Additionally, devices other than the mobile phone terminal device 100 as shown in FIG. 9 may be used to perform the features discussed in present disclosure. For example, aspects of the present disclosure may be executed on a smart phone, a tablet, a general purpose computer, a laptop, an electronic reading device, or other such display terminals.

The above disclosure also encompasses the embodiments noted below.

(1) An information processing apparatus comprising: a microphone configured to detect input voice instructions; a memory configured to store a plurality of keywords, each keyword being associated with a predetermined function of the information processing apparatus; first circuitry configured to compare an input voice instruction with the plurality of keywords stored in the memory; and activate second circuitry, which is configured to execute an application based on the comparison.

(2) The information processing apparatus of (1), wherein the second circuitry is in a suspended state when the first circuitry performs the comparison.

(3) The information processing apparatus of (1), wherein the first circuitry is continuously in an active state when the second circuitry is in an active state.

(4) The information processing apparatus of (1), wherein the first circuitry activates the second circuitry based on a successful match of the input voice instruction with a keyword.

(5) The information processing apparatus of (1), wherein the voice instructions are modulated by pulse code modulation before being stored in the memory.

(6) The information processing apparatus of (5), wherein the modulated voice instructions are input to the memory at a fixed time period.

(7) The information processing apparatus of (6), wherein the first circuitry is in an active state for a fraction of the fixed time period.

(8) The information processing apparatus of (1), wherein the input voice instructions include the keyword and further instructions to execute the application.

(9) The information processing apparatus of (1), wherein the first circuitry activates the second circuitry by an interrupt signal.

(10) The information processing apparatus of (1), wherein the first circuitry and the second circuitry exchange data through a plurality of data lines.

(11) The information processing apparatus of (1), wherein the first circuitry and the second circuitry exchange control information through a plurality of control lines.

(12) The information processing apparatus of (1), wherein the second circuitry receives information from the first circuitry regarding a successful match of the voice instruction and the keyword and searches for the corresponding application associated with the keyword.

(13) The information processing apparatus of (12), wherein the second circuitry executes the application upon a successful keyword search.

(14) The information processing apparatus of (1), wherein the first circuitry includes a driving unit configured to activate the second circuitry.

(15) The information processing apparatus of (1), wherein the first circuitry is configured to match an input voice with a registered voice of an authorized user.

(16) The information processing apparatus of (15), wherein the first circuitry is further configured to match an input keyword to a predetermined keyword.

(17) The information processing apparatus of (16), wherein the second circuitry is configured to execute the application by any user.

(18) An information processing method performed by an information processing apparatus, the method comprising: receiving input voice instructions from a microphone; storing a plurality of keywords in a memory, each keyword associated with a predetermined function of the information processing apparatus; comparing by a first circuitry the input voice instruction with the plurality of keywords; activating a second circuitry, by the first circuitry based on the comparing; and executing an application by the second circuitry corresponding to the keyword associated with the application.

(19) A non-transitory computer-readable medium including computer program instructions, which when executed by an information processing apparatus, cause the information processing apparatus to perform a process, the process comprising: receiving input voice instructions from a microphone; storing a plurality of keywords in a memory, each keyword associated with a predetermined function of the information processing apparatus; comparing by a first circuitry the input voice instruction with the plurality of keywords; activating a second circuitry, by the first circuitry based on the comparing; and executing an application by the second circuitry corresponding to the keyword associated with the application.

The invention claimed is:

1. An information processing apparatus comprising:
a mobile terminal device;
a microphone, disposed in the mobile terminal device, configured to receive input voice instructions;
first circuitry, disposed in the mobile terminal device, configured to determine a first input voice instruction as an activation keyword spoken by a registered user and to output an activation signal when the first input voice instruction is determined as the activation keyword and as having been spoken by the registered user, the first circuitry not outputting the activation signal when the first input voice instruction is determined as the activation keyword and as having been spoken by an un-registered user, the first circuitry being configured to operate in an active state; and second circuitry, disposed in the mobile terminal device, configured to be in a sleep state while the first circuitry is in the active state until the second circuitry receives the activation signal, to enter the active state in response to the activation signal triggered by the spoken activation keyword of the registered user, and to execute an application based on a second input voice instruction that is received by the microphone subsequent to the first voice input instruction after entering the active state, the second input voice instruction being spoken by the un-registered user, wherein the un-registered user is a different person than the registered user.

2. The information processing apparatus of claim 1, wherein
the second circuitry is in the sleep state when the first circuitry performs the determination.

3. The information processing apparatus of claim 1, wherein
the first circuitry is continuously in the active state when the second circuitry is in the active state.

4. The information processing apparatus of claim 1, wherein
the voice instructions are modulated by pulse code modulation.

5. The information processing apparatus of claim 1, wherein
the first circuitry activates the second circuitry by an interrupt signal.

6. The information processing apparatus of claim 1, wherein
the first circuitry and the second circuitry exchange data through a plurality of data lines.

7. The information processing apparatus of claim 1, wherein
the first circuitry and the second circuitry exchange control information through a plurality of control lines.

8. The information processing apparatus of claim 1, wherein
the second circuitry receives information from the first circuitry regarding a successful match of the second input voice instruction and a corresponding one of a plurality of application keywords and searches for the corresponding application associated with the corresponding one of the application keywords.

9. The information processing apparatus of claim 8, wherein the second circuitry executes the application upon a successful keyword search.

10. The information processing apparatus of claim 1, wherein
the first circuitry includes a driving unit configured to activate the second circuitry.

11. The information processing apparatus of claim 1, further comprising:
a memory circuit configured to store the activation keyword and a plurality of application keywords, each of the plurality of application keywords being associated with a predetermined function of the information processing apparatus; and
a buffer memory circuit configured to operate independently of the active state and the sleep state of the first circuitry, to store the first input voice instruction while the first circuitry operates in the sleep state, and to supply the first input voice instruction stored while the first circuitry operates in the sleep state to the first circuitry when the first circuitry is in the active state, wherein the second circuitry is configured to compare the second input voice instruction with the plurality of application keywords, determine when the application is finished executing, and, when the application is finished executing, to determine whether a security time requiring another input of the first input voice instruction has elapsed since the activation signal is outputted.

12. An information processing method performed by an information processing apparatus, the method comprising:
receiving a first input voice instruction and a second input voice instruction from a microphone disposed in a mobile terminal device of the information processing apparatus, the second input voice instruction being subsequent to the first input voice instruction;
operating a first circuitry disposed in the mobile terminal device in an active state;
determining, by the first circuitry, the first input voice instruction as an activation keyword spoken by a registered user and outputting an activation signal when the first input voice instruction is determined as the activation keyword and as having been spoken by the registered user, the activation signal not being outputted when the first input voice instruction is determined as the activation keyword and as having been spoken by an un-registered user;
maintaining a second circuitry disposed in the mobile terminal device in a sleep state while the first circuitry is in the active state until the second circuitry receives the activation signal and activating the second circuitry from the sleep state into the active state, by the activation signal triggered by the spoken activation keyword of the registered user; and
executing an application by the second circuitry corresponding to the second voice input instruction after entering the active state, the second input voice instruction being spoken by the un-registered user, wherein the un-registered user is a different person than the registered user.

13. A non-transitory computer-readable medium including computer program instructions, which when executed by an information processing apparatus, cause the information processing apparatus to perform a process, the process comprising:
receiving, from a microphone disposed in a mobile terminal device of the information processing apparatus, a first input voice instruction and a second input voice instruction from a microphone, the second input voice instruction being subsequent to the first input voice instruction;
operating a first circuitry disposed in the mobile terminal device in an active state;
determining, by the first circuitry, the first input voice instruction as an activation keyword spoken by a registered user and outputting an activation signal when the first input voice instruction matches the activation keyword and as determined to have been spoken by the registered user, the activation signal not being outputted when the first input voice instruction is determined as the activation keyword and as having been spoken by an un-registered user;
maintaining a second circuitry disposed in the mobile terminal device in a sleep state while the first circuitry is in the active state until the second circuitry receives the activation signal and activating the second circuitry from the sleep state into the active state, by the activation signal triggered by the spoken activation keyword of the registered user; and executing an application by the second circuitry corresponding to the second voice instruction after entering the active state, the second input voice instruction being spoken by the un-registered user, wherein the un-registered user is a different person than the registered user.

\* \* \* \* \*